United States Patent
Hay et al.

(10) Patent No.: US 6,662,360 B1
(45) Date of Patent: Dec. 9, 2003

(54) METHOD AND SYSTEM FOR SOFTWARE CONTROL OF HARDWARE BRANCH PREDICTION MECHANISM IN A DATA PROCESSOR

(75) Inventors: Robert William Hay, Austin, TX (US); James Allan Kahle, Austin, TX (US); Brian R. Konigsburg, Austin, TX (US); David Stephen Levitan, Austin, TX (US); Balaram Sinharoy, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/407,105

(22) Filed: Sep. 27, 1999

(51) Int. Cl.[7] .............................. G06F 9/44; G06F 9/45; G06F 15/00
(52) U.S. Cl. ..................... 717/131; 717/154; 712/239
(58) Field of Search ................. 712/232–235, 712/237–240, 226; 717/131, 141, 127, 151–161; 711/204

(56) References Cited

U.S. PATENT DOCUMENTS

| | | | | |
|---|---|---|---|---|
| 5,051,896 A | * | 9/1991 | Lee et al. | 712/226 |
| 5,454,117 A | * | 9/1995 | Puziol et al. | 395/800 |
| 5,659,752 A | * | 8/1997 | Heisch et al. | 717/158 |
| 5,857,104 A | * | 1/1999 | Natarjan et al. | 395/705 |
| 6,115,809 A | * | 9/2000 | Mattson et al. | 712/239 |
| 6,341,348 B1 | * | 1/2002 | Tremblay | 712/239 |
| 6,367,071 B1 | * | 4/2002 | Cao et al. | 717/160 |
| 6,374,351 B2 | * | 4/2002 | Tremblay | 712/239 |
| 6,487,715 B1 | * | 11/2002 | Chamdani et al. | 717/154 |

OTHER PUBLICATIONS

Calder et al. Corpus–based Static Branch Prediction. ACM. 1995. pp. 79–92.*
Holtmann et al. Experiments with Low–Level Speculative Computation Based on Multiple Branch Prediction. IEEE. 1993. pp. 262–267.*
Holtmann et al. Speculative Computation for Coprocessor Synthesis. IEEE. 1993. pp. 126–131.*
Lakshminarayana et al. Incorporating Speculative Execution into Scheduling of Control–flow Intensive Behavioral Descriptions. IEEE. 1998. pp. 108–113.*
Nair. Dynamic Path–Based Branch Correlation. IEEE. 1995. pp. 15–23.*
Brad Calder et al.; Evidence–based Static Branch Prediction using Machine Learning, Aug. 22, 1996, [retrieved Nov. 4, 2002] <URL:http://citeseer.nj.nec.com/calder96evidencebased.html>.*
Johnny K.F. Lee and Alan Jay Smith, "Branch Prediction Strategies and Branch Target Buffer Design"; Jan. 1984, IEEE Computer; vol. 17, pp. 6–22.*

* cited by examiner

Primary Examiner—Wei Zhen
(74) Attorney, Agent, or Firm—Casimer K. Salys; Bracewell & Patterson, L.L.P.

(57) ABSTRACT

A method and system is disclosed for software manipulation of hardware prediction mechanism in a data processor with software prediction. The hardware branch prediction mechanism is enhanced with at least two bits for path prediction. These bits are settable by a software and are capable of overriding the hardware branch prediction mechanism. Branch prediction information is encoded into a branch instruction in the software. This information includes a pre-determined value for each bit. Finally, a branch path of said instruction is predicted based on the value of the bits.

8 Claims, 5 Drawing Sheets

METHOD AND SYSTEM FOR SOFTWARE CONTROL OF HARDWARE BRANCH PREDICTION MECHANISM IN A DATA PROCESSOR

BACKGROUND OF THE INVENTION

1. Technical Field

The present invention relates in general to a method and system for data processing and in particular to a method and system for executing instructions within a data processor. Still more particularly, the present invention relates to a method and system for executing branch instructions within a data processor utilizing software to direct hardware branch prediction mechanisms to take a particular path.

2. Description of the Related Art

A conventional high performance superscalar processor typically includes an instruction cache for storing instructions, an instruction buffer for temporarily storing instructions fetched from the instruction cache for execution, a number of execution units for executing sequential instructions, a Branch Processing Unit (BPU) for executing branch instructions, a dispatch unit for dispatching sequential instructions from the instruction buffer to particular execution units, and a completion buffer for temporarily storing instructions that have finished execution, but have not been completed.

As is well known in the art, sequential instructions fetched from the instruction queue are stored within the instruction buffer pending dispatch to the execution units. In contrast, branch instructions fetched from the instruction cache are typically forwarded directly to the branch processing unit for execution. The branch processing unit utilizes a prediction mechanism, such as a branch history table, to predict which execution path should be taken. If a branch is predicted taken, instructions at the target address of the branch instruction are fetched and executed by the processor. In addition, any sequential instructions following the branch that have been prefetched are discarded. However, the outcome of a branch instruction often cannot be determined prior to executing the branch instruction. In conventional processors, the dispatch of sequential instructions following a branch predicted as taken is halted and instructions from the speculative target instruction stream are fetched during the next processor cycle. If the branch that was predicted as taken is resolved as mispredicted, a mispredict penalty is incurred by the processor due to the time required to restore the sequential execution stream following the branch instruction; Similarly, if the branch that was predicted as not taken is resolved as mispredicted, a mispredict penalty is incurred by the processor due to the time required to fetch and execute from the target instruction stream.

A high performance processor achieves high instruction throughput by fetching and dispatching instructions under the assumption that branches are correctly predicted and allows instructions to execute without waiting for the completion of previous instructions. This is commonly known as speculative execution, i.e., executing instructions that may or may not have to be executed. The CPU guesses which path the branch is going to take. This guess may be a very intelligent guess (as in a branch history table) or very simple guess (as in always guess path not taken). Once the guess is made, the CPU starts executing that path. Typically, the processor executes instructions speculatively when it has resources that would otherwise be idle, so that the operation may be done at minimum or no cost. Therefore, in order to enhance performance, some processors speculatively predict the path to be executed after an unresolved branch instruction. Utilizing the result of the prediction, the fetcher then fetches instructions from the predicted path prior to the resolution of the branch, thereby avoiding a stall in the execution pipeline if the branch is resolved as correctly predicted. Thus, if the guess is correct, there are no holes in the instruction sequence or delays in the pipeline and execution continues at full speed. If, however, subsequent execution of the branch indicate that the branch was wrongly predicted, the processor has to abandon any result that the speculatively executed instructions produced and begin executing the path that should have been taken. The processor "flushes" or throws away the results of these wrongly executed instructions, backs itself up to get a new address, and executes the correct instructions.

Prior art handling of this speculative execution of instructions includes U.S. Pat. No. 5,454,117 which discloses a branch prediction hardware mechanism. The mechanism performs speculative execution based on the branch history information in a table. Similarly, U.S. Pat. No. 5,611,063 discloses a method for tracking allocation of resources within a processor utilizing a resource counter which has two bits set in two possible states corresponding to whether or not the instruction is speculative or when dispatched to an execution unit respectively. Also, Digital Equipment Corporation's Alpha AXP Architecture includes hint bits utilized during its jump instructions. However, as the name implies, these bits are hint only and are often ignored by the jump mechanism.

Most operations can be performed speculatively as long as the processor appears to follow a simple sequential method, such as those in a scalar processor. For some applications, however, speculative operations can be a severe detriment to the performance of the processor. For example, in the case of executing a load instruction after a branch instruction (known as speculative load because the load instruction is executed speculatively without knowing exactly which path of the branch would be taken), if the predicted execution path is incorrect, there is a high delay penalty incurred when the pending speculative load in the instruction stream requests the required data from the system bus. In many applications, the rate of mis-predicted branches is high enough that the cost of speculatively accessing the system bus is prohibitively expensive. Furthermore, essential data stored in a data cache may be displaced by some irrelevant data obtained from the system bus because of a wrongful execution of a speculative load instruction caused by misprediction. A need, therefore, exists for improvements in branch prediction and speculative execution.

Presently, most prediction mechanisms operate as hardware prediction. These predicted paths, when mispredicted, tend to corrupt the hardware memory with the results of the speculatively executed instructions. However, certain classes of branches should not be predicted by hardware when the software can tell with a particular degree of certainty which path to take. Presently, no prior art discloses a processor method or system for utilizing software to directly control a hardware prediction mechanism. Consequently, a system and method for software controlled branch prediction mechanism is desired.

It would therefore be desirable to provide a method and system for combining software and hardware branch prediction in a high performance processor. It is further desirable to provide a method and system which allows a developer or compiler of a software code (or program) which has a pre-determined and/or desired path during branch prediction to control the actual path predicted by manipulating the hardware prediction mechanism with a software input.

SUMMARY OF THE INVENTION

It is therefore one object of the present invention to provide an improved method and system for data processing.

It is another object of the present invention to provide an improved method and system for executing instructions within a data processor.

It is yet another object of the present invention to provide a method and system for executing branch instructions within a data processor utilizing software to direct hardware branch prediction mechanisms to take a particular path.

The foregoing objects are achieved as is now described. A method and system for software manipulation of hardware branch prediction mechanism in a data processor is disclosed. The hardware branch prediction mechanism is enhanced with at least two bits for path prediction. These bits may be set by software and are capable of overriding the hardware branch prediction mechanism. Branch prediction information is encoded into a branch instruction in the software. This information includes a pre-determined value for each bit. Finally, a branch path of the instruction is predicted based on the value of the bits.

In one embodiment, a first bit is set to one of two possible values wherein a first value corresponds to hardware branch prediction and a second value corresponds to software branch prediction. The second bit is set to a value corresponding to the software prediction path desired.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
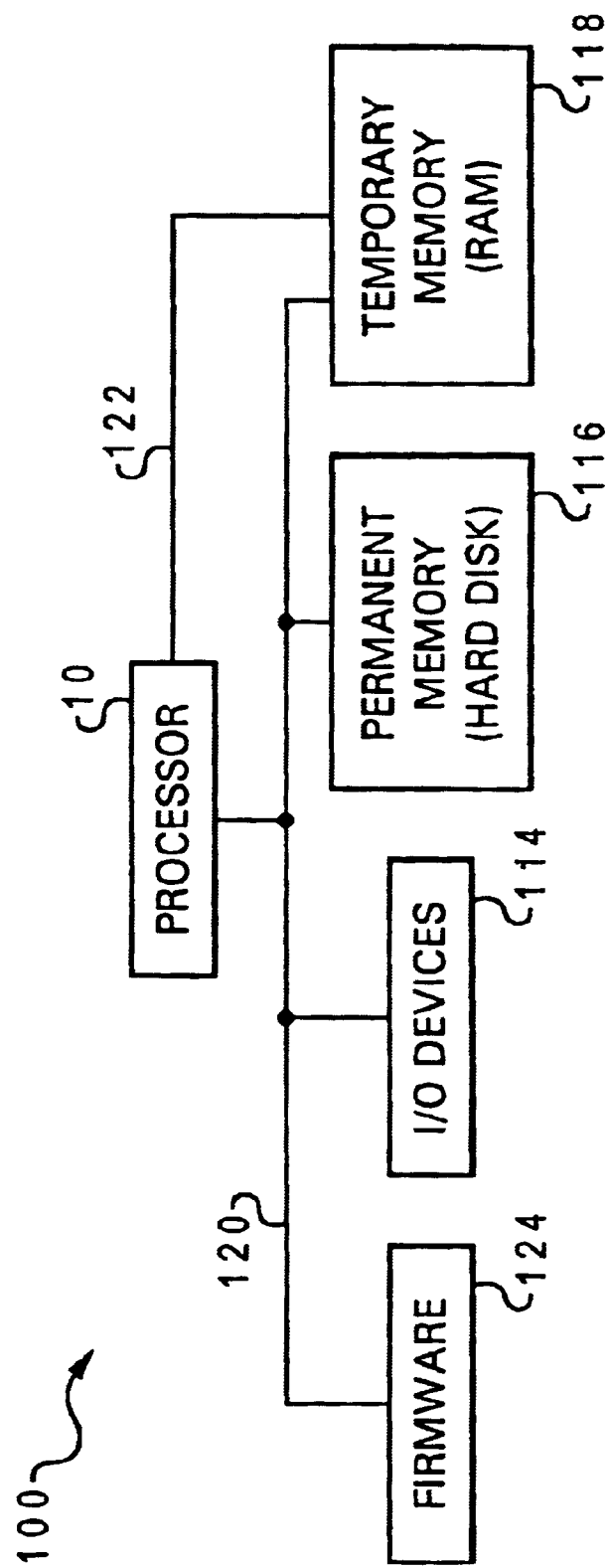
FIG. 1 is a block diagram of a data processing system utilized in one embodiment of the present invention.

With reference now to the figures and in particular with reference to FIG. 1, there is illustrated a block diagram of the basic structure of a data processing system 100 utilized in the preferred embodiment of the invention. Data processing system 100 has at least one central processing unit (CPU) or processor 10 which is connected to several peripheral devices, including input/output devices 114 (such as a display monitor, keyboard, and graphical pointing device) for user interface, a permanent memory device 116 (such as a hard disk) for storing the data processing system's operating system and user programs/applications, and a temporary memory device 118 (such as random access memory or RAM) that is utilized by processor 10 to implement program instructions. Processor 10 communicates with the peripheral devices by various means, including a bus 120 or a direct channel 122 (more than one bus may be provided utilizing a bus bridge).

Those skilled in the art will further appreciate that there are other components that might be utilized in conjunction with those shown in the block diagram of FIG. 1; for example, a display adapter connected to processor 10 might be utilized to control a video display monitor, and a memory controller may be utilized as an interface between temporary memory device 118 and processor 10. Data processing system 100 also includes firmware 124 whose primary purpose is to seek out and load an operating system from one of the peripherals (usually permanent memory device 116) whenever the data processing system is first turned on. In the preferred embodiment, data processing system contains a relatively fast CPU or processor 10 along with sufficient temporary memory device 118 and space on permanent memory device 116, and other required hardware components necessary for providing efficient execution of instructions.

While an illustrative embodiment of the present invention has been; and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analog communication links.

The RS/6000 family is an example of a superscalar processor. It combines the benefits of UNIX computing with IBM's leading edge RISC technology. Although the invention is being described with reference to the above mentioned data processing systems, these references are in no way meant to be limiting on the invention. Other system types and architecture may be utilized in implementing the invention.

Figure 2:
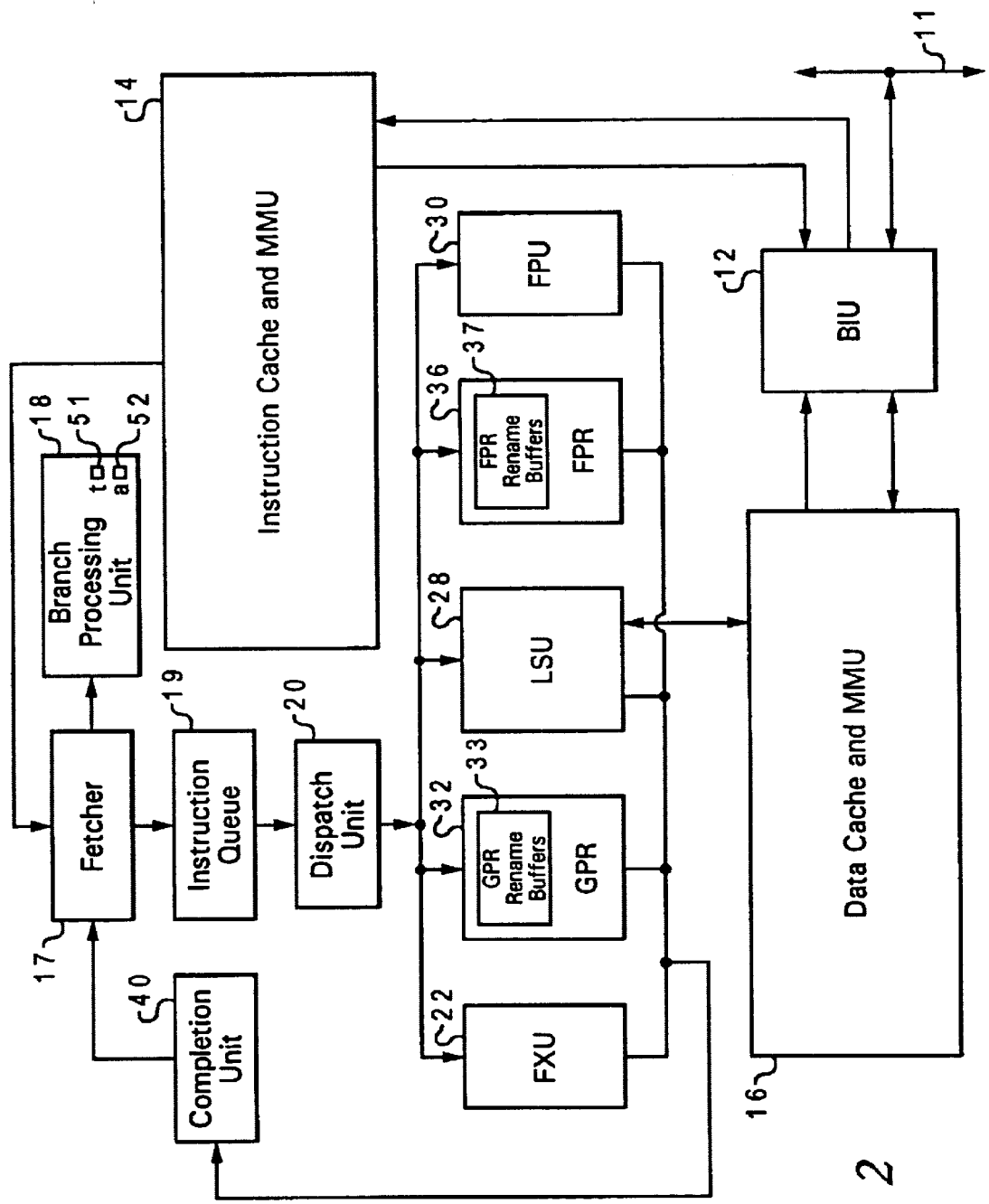
FIG. 2 is a block diagram of a preferred embodiment of a processor which utilizes the method and system of the present invention.

FIG. 2 is a block diagram of processor 10, for processing information according to a preferred embodiment of the present invention. Processor 10 may be located within data processing system 100 as depicted in FIG. 1. In the depicted embodiment, processor 10 comprises a single integrated circuit superscalar microprocessor. Accordingly, as discussed further below, processor 10 includes various execution units, registers, buffers, memories, and other functional units, which are all formed by integrated circuitry. In a preferred embodiment of the present invention, processor 10 comprises one of the PowerPc™ line of microprocessors, which operates according to reduced instruction set computing (RISC) techniques. As depicted in FIG. 1, processor 10 is coupled to system bus 11 via a bus interface unit (BIU) 12 within processor 10. BIU 12 controls the transfer of information between processor 10 and other devices coupled to system bus 11 such as a main memory (not illustrated). Processor 10, system bus 11, and the other devices coupled to system bus 11 together form a data processing system.

BIU 12 is connected to instruction cache 14 and data cache 16 within processor 10. High speech caches, such as instruction cache 14 and data cache 16, enable processor 10 to achieve relatively fast access time to a subset of data or instructions previously transferred from main memory to instruction cache 14 and data cache 16, thus improving the speech of operation of the data processing system. Instruction cache 14 is further coupled to sequential fetcher 17, which fetches instructions from instruction cache 14 during each cycle for execution. Sequential fetcher 17 stores sequential instructions within instruction queue 19 for execution by other execution circuitry within processor 10. Branch instructions are also transmitted to branch processing unit (BPU) 18 for execution. BPU 18 is a branch prediction and fetch redirection mechanism.

In the depicted embodiment, in addition to BPU 18, the execution circuitry of processor 10 comprises multiple execution units, including fixed-point unit (FXU) 22, load/ store unit (LSU) 28, and floating-point unit (FPU) 30. As is well known by those skilled in the art, each of execution units FXU 22, LSU 28, and FPU 30 executes one or more instructions within a particular class of sequential instructions during each processor cycle. For example, FXU 22 performs fixed-point mathematical operations such as addition, subtraction, ANDing, ORing, and XORing utilizing source operands received from specified general purpose registers (GPRs) 32. Following the execution of a fixed point instruction, FXU 22 outputs the data results of the instruction to GPR rename buffers 33, which provide temporary storage for the result data until the instruction is completed by transferring the result data from GPR rename buffers 33 to one or more of GPRs 32. Conversely, FPU 30 performs floating-point operations, such as floating-point multiplication and division, on source operands received from floating-point registers FPRs 36. FPU 30 outputs data resulting from the execution of floating-point instructions to selected FPR rename buffers 37, which temporarily store the result data until the instructions are completed by transferring the result data from FPR rename buffers 37 to selected FPRs 36. As its name implies, LSU 28 executes floating-point and fixed-point instructions which either load data from memory (i.e., either data cache 16, a lower level cache, or main memory) into selected GPRs 32 or FPRs 36 or which store data from a selected GPRs 32 or FPRs 36 to memory.

Processor 10 employs both pipelining and out-of-order execution of instructions to further improve the performance of its superscalar architecture. Accordingly, instructions can by executed by FXU 22, LSU 28, and FPU 30 in any order as long as data dependencies are observed. In addition, instructions are processed by each of FXU 22, LSU 28 and FPU 30 at a sequence of pipeline stages. As is typical of high performance processors, each instruction is processed at five distinct pipeline stages, namely, fetch, decode/dispatch, execute, finish and completion.

During the fetch stage, sequential fetcher 17 retrieves one or more instructions associated with one or more memory addresses from instruction cache 14. Sequential instructions fetched from instruction cache 14 are stored by sequential fetcher 17 within registers such as instruction queue 19. Additionally, sequential fetcher 17 also forwards branch instructions from within the instruction stream to BPU 18 for execution.

BPU 18 includes a branch prediction mechanism (hardware), which in one embodiment comprises a dynamic prediction mechanism such as a branch history table, that enables BPU 18 to predict whether the branch will be taken or not taken. BPU 18 also speculatively executes unresolved conditional branch instructions and makes the necessary corrections if there is a misprediction. Alternatively, in other embodiments of the present invention, a static, compiler-based prediction mechanism is implemented. A compiler is one type of program restructurer, which produces corresponding assembly or machine language from a relatively higher level language program. Other types of program restructurers, such as a feedback directed program restructurer, may produce a restructured version of a program in the same language as the original program. As will be described in greater detail below, the present invention combines software and hardware prediction mechanisms and enables forced prediction of branch instructions.

For purposes of this invention, special types of branches, synchronization branches, are defined. Synchronization branches are branches which are utilized for lock acquisition or to implement various synchronization primitives such as, compare and swap, test and set, fetch and store, etc. see *The PowerPC™ Architecture: A Specification for a New Family of RISC Processors*, Book II, Section 1.8.2 "Atomic Update Primitives", and Appendix E: Programming Examples, E.1 "Synchronization," which is hereby incorporated.

During the decode/dispatch stage, dispatch unit 20 decodes and dispatches one or more instructions from instruction queue 19 to the appropriate ones of execution units FXU 22, LSU 28 and FPU 30. Decoding involves determining the type of instruction including its characteristics and the execution unit to which it should be dispatched. In the preferred embodiment, it also involves determining whether or not the instruction is speculative and checking bits within the software and corresponding hardware mechanism for a predicted branch path. The "bits" (register areas) within the hardware mechanism are referred to herein as an "a" bit 52 and a "t" bit 51. In the preferred embodiment, these bits are located within the Branch Operation (BO) field of the branch instructions in the PowerPC™ architecture. Those skilled in the art are familiar with a PowerPC instruction set architecture and are familiar with the set of bits utilized as control bits within instructions. The BO field specifies the conditions under which the branch is taken. In the preferred embodiment, these bits may be set to "on" or "off" (1 or 0). Further, these bits may be in one of a plurality of locations within the BO field which typically comprises of five bits. The location of the a and t bits are determined by a system developer and is limited by the number of available bits and the desire to implement the invention on current system architecture.

During the decode/dispatch stage, dispatch unit 20 allocates a rename buffer within GPR rename buffers 33 or FPR rename buffers 37 for each dispatched instructions' result data. According to a preferred embodiment of the present invention, dispatch unit 20 is connected to execution units FXU 22, LSU 28 and FPU 30 by a set of registers (not shown). Once an instruction is completed processing, a message is sent to completion unit 40. If the completed instruction is a conditional branch instruction and the BPU 18 determines that the branch was mispredicted, then it signals the completion unit 40 about the completion and signals the instruction fetcher 17 to fetch from the corrected address.

The invention contemplates that for some branches, the software knows with a particular degree of certainty what the prediction ought to be. In the preferred embodiment, a first bit is available in an instruction telling what the program restructurer branch prediction is. Additionally, a second bit is available which indicates to the data processor running the software that the program restructurer prediction is the one that should be utilized.

The Power PC architecture utilized in the preferred embodiment, provides a series of bits within the BO field which can be set on or off (0 or 1) by software. The bits are utilized within the invention for signaling a branch prediction mechanism during branch prediction. In the preferred embodiment, the first bit, the "a" bit, messages the hardware whether to utilize its own internal branch prediction or a software provided branch prediction, the software provided prediction being defined in the "t" bit. When the "a" bit is set/on, the hardware defaults/defers to the software predicted path selected in the "t" bit. This software predicted path is determined by the "t" bit, which is utilized to determine whether to predict a branch as taken or not. Thus, this "t" bit, when on, indicates one path, and when off indicates a different path.

Assuming that the processor supports multi-way branching (i.e. one of two or more targets can be selected when the branch is taken), the invention contemplates having the single "t" bit replaced by a set of bits capable of representing each of the plurality of paths individually. Those skilled in the art are familiar with multi-way branching and understand how the invention as described may be extended to include such configurations. For the purpose of this invention all references to this functional element will be as the "t" bit, whether singular or not. The software defines bits in the instruction set architecture for conditional branch instructions to provide hints to the hardware. According to the invention, a software prediction may deliberately force a hardware branch prediction mechanism to mispredict a branch. During these forced predicted paths, in the preferred embodiment, the branch history tables are not affected. More clearly, when the "a" bit is 1, there is no update to the branch history table.

More specifically, in one embodiment, the locations of the "a" and "t" bits in the BO-field includes 011at, 001at, 1a00t, and 1a01t. As stated above, the "a" bit indicates whether the software prediction is taken. The "t" bit indicates, for instances when the software prediction is utilized, whether the branch is taken or not taken. For branches which are software predicted, there is no need to update the branch history tables.

In one embodiment, the invention is implemented when the conditional branch is known at compile time to be almost always uni-directional (for example, branches that guard segments of code that is only executed when a rare event occurs). That is, for such a conditional branch, the compiler directive forces the processor to predict responsive to the compiler's prediction, rather than the processor branch predictor's direction. Further, the compiler prediction forces the branch to always be predicted as the one certain direction. This increases the accuracy of the prediction, i.e., increases the proportion of correct predictions. It also reduces branch history table (BHT) aliasing, because it does not take up an entry in the BHT.

To generalize on the above, the invention is particularly advantageous where a processor has a small branch history table, because, knowing that the processor has the small table, the programmer or the program restructurer can deliberately code the program with mainly unidirectional branches and use software prediction to minimize BHT aliasing. Also, infrequently executed branches can be predicted by software prediction in such a case, to reduce BHT aliasing.

In one embodiment, utilized for error recovery, the conditional branch is marked as software predicted and the hardware does not put it in the prediction table. In another implementation of the invention, a conditional branch is forced to be always predicted in a given direction, irrespective of the branch outcome, when it is known to be the best decision due to reasons other that just the branch misprediction penalty. For example, if the synchronization branches are always predicted in one direction (irrespective of the actual outcome), the invention reduces lock contention traffic and allow earlier acquisition and speculative execution within the critical section guarded by the lock when it is free or becomes free. The invention thus reduces lock contention traffic and the instructions within a critical section (guarded by the lock) can be executed speculatively. This is useful if the lock is available when the branches are fetched.

The invention may also be utilized to force a conditional branch to be always mispredicted. This allows some instructions to be speculatively executed. The speculatively executed instructions in the (wrongly) predicted path can be utilized as a hint instruction to the memory subsystem. In this embodiment, it is assumed that a fetch mechanism will cause instructions to be fetched from memory if they are not in the nearest instruction cache (I-cache). An I-cache prefetch operation is constructed by: (1) sending a conditional branch to branch over the next instruction and an unconditional branch to a "fetch target"; and (2) arranging the branch condition to always be taken. The "override" and "taken" bits are set to trick the fetcher to follow the fall-through path to unconditional. The invention thus acts as a prefetching mechanism as the mispredicton results in bringing instructions from memory. In this embodiment, the hint instruction is placed immediately after the conditional branch. The second software indicator indicates when the unconditional branch instruction is to be utilized as a hint, so the conditional branch is not taken. When the unconditional branch instruction is utilized as a hint and the branch instructions are speculatively executed, the memory subsystem prefetches data targeted by the unconditional branch instruction from memory. The invention results in a more efficient processing of the processor.

Figure 3:
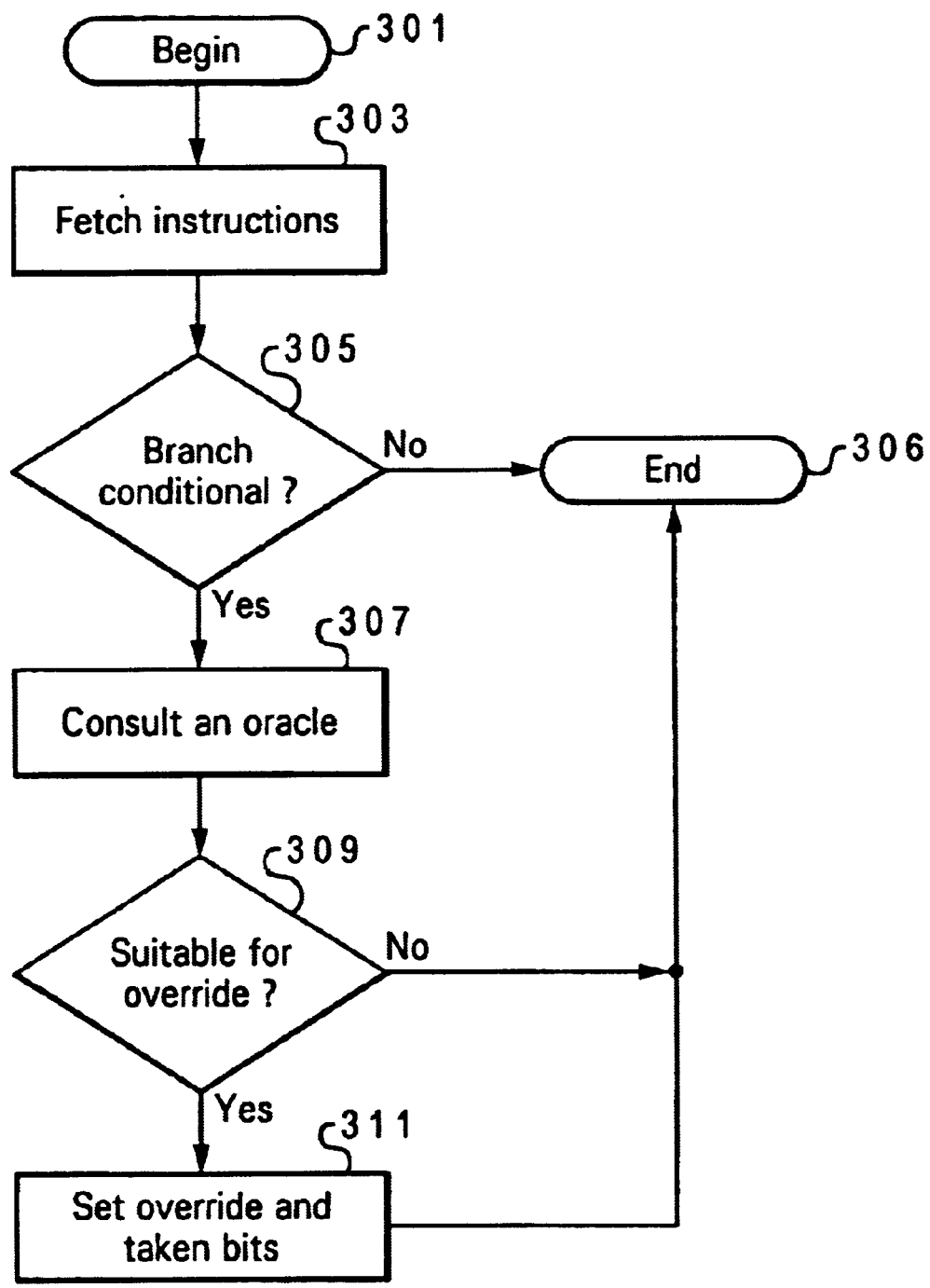
FIG. 3 is a flow chart depicting the process of determining whether or not to utilize a conditional branch according to one implementation of the present invention.

FIG. 3 depicts a flow chart of the process involved in the implementation of one embodiment of the present invention. The process begins (step 301) when instructions are fetched (step 303). A check is made to determine if the instruction is a conditional branch (step 305). If the branch is not conditional, the process ends (step 306). If, however, the branch is conditional, an oracle is consulted (step 307). In this embodiment, the oracle refers to mechanisms within a data processor including a program restructurer directive, profile information and hand-coded assembler. It is utilized to determine whether or not one path dominates in actual use. A check is then made to determine if the instruction is suitable for override of the hardware prediction (step 309). If it is not, then the process ends (step 306). If it is, then the override and path taken bits are set for the subject branch (step 311) before the process ends (step 306).

Figure 4:
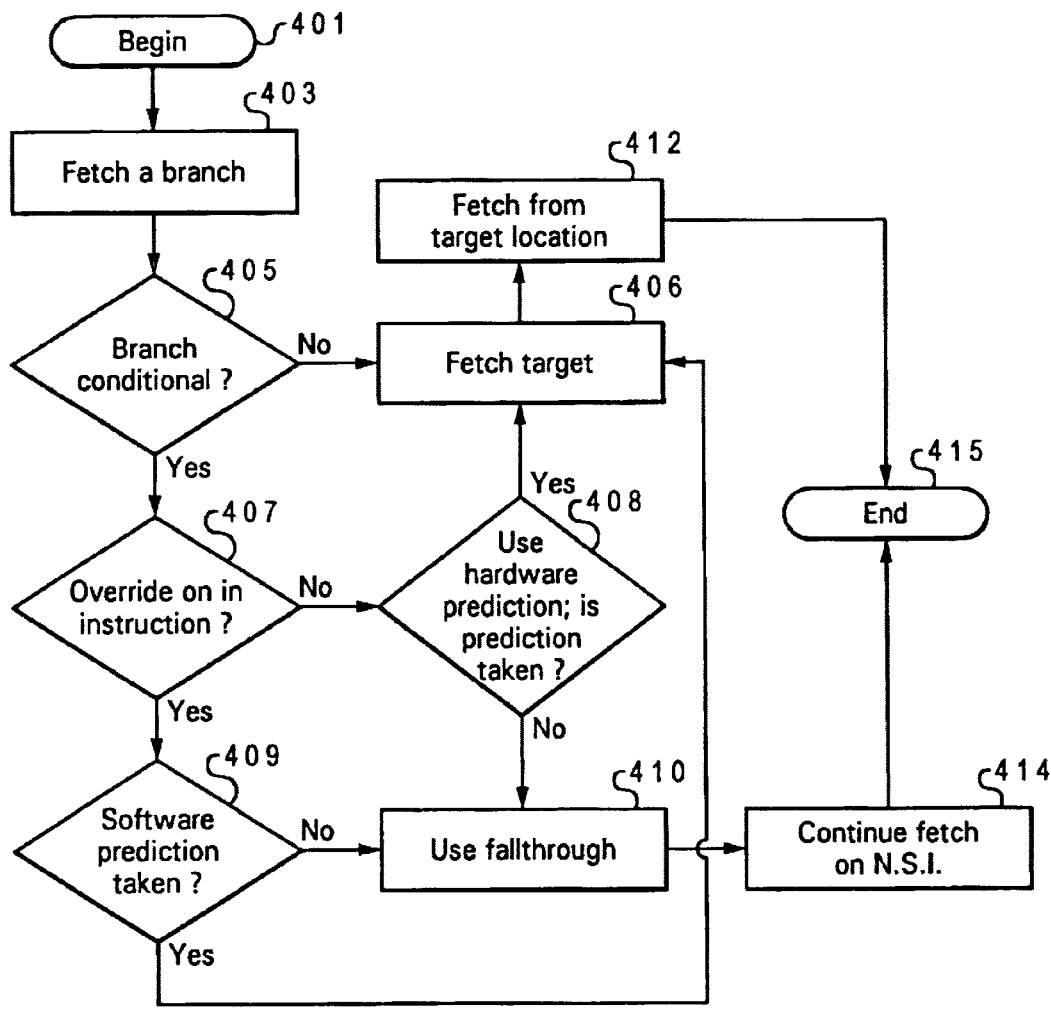
FIG. 4 is a flow chart depicting the process wherein a data processor responds to a received override bit in accordance with one embodiment of the present invention.

FIG. 4 depicts the process of determining whether or not to utilize hardware prediction. The process begins (step 401) when a branch is fetched (step 403). A check is made to determine if the branch is conditional (step 405). If the branch is not conditional, the process fetches a target (step 406) and redirects the fetch (step 412). If however, the branch is conditional, then another check is made to determine if the override bit is on in the instruction (step 407). If the override bit is not on, then hardware prediction is utilized (step 408). Utilization of hardware prediction (step 408) entails a determination of whether to utilize fall-through (step 410) or redirect instruction fetcher to begin fetching a target of the branch (step 406). If however, the override bit is on in the instruction, then a final check is made to determine if software prediction is taken (step 409). When software prediction is not taken, then the system defaults to utilizing fall-through (step 410) and continuing the fetch on the next sequential instruction (step 414). If however, redirection is indicated, then the process fetches a target (step 406) based on the forced prediction path. After redirecting a fetch (step 412) and/or continuing to fetch on next sequential instruction (step 414) the process ends (step 415).

Figure 5:
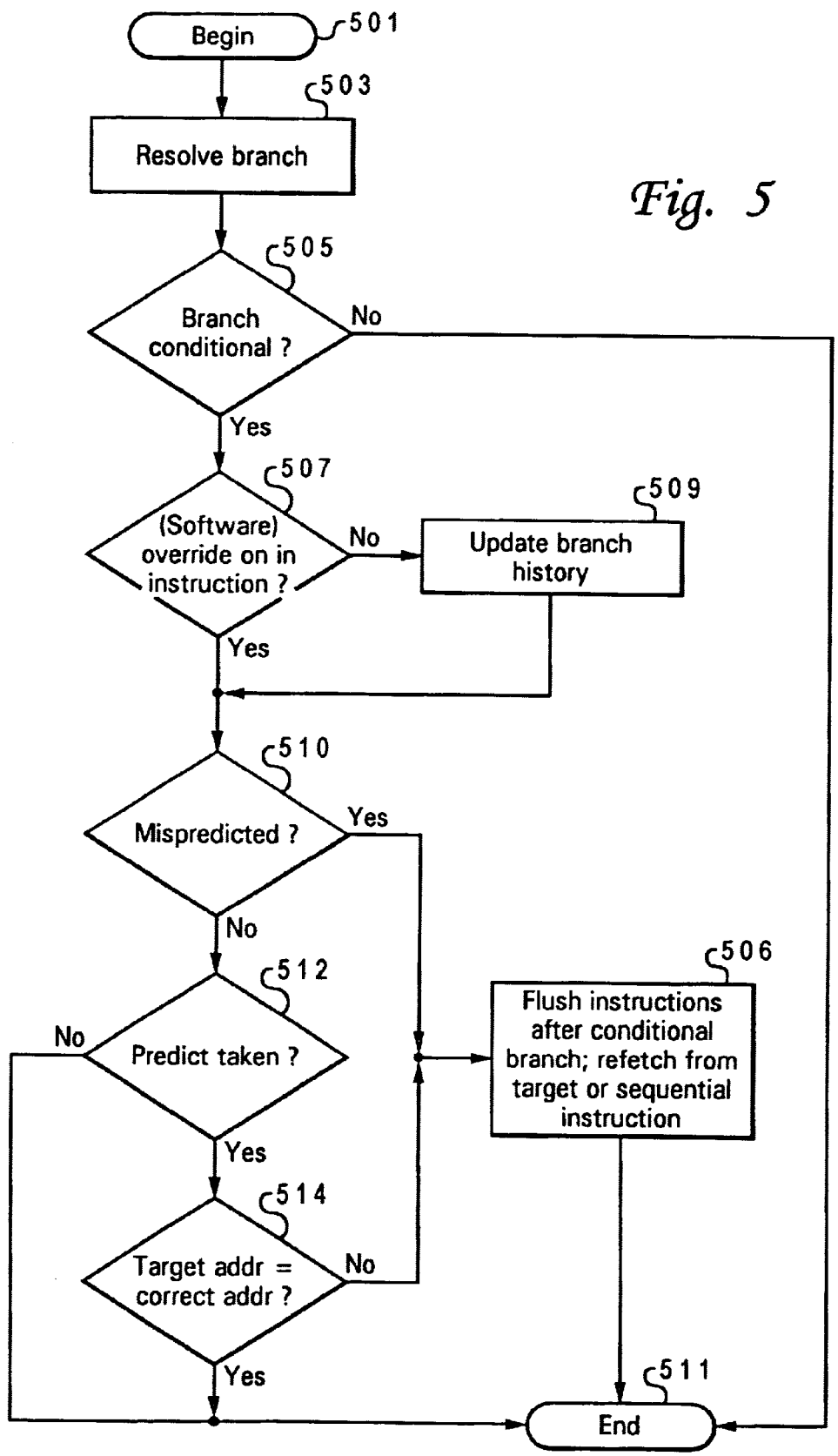
FIG. 5 is a flow chart depicting the process of updating a branch history table during one implementation of the present invention.

FIG. 5 depicts the process of the hardware determining the method of prediction to utilize. The process begins (step 501) by the system resolving the branch (step 503). A check is made to determine if the branch is conditional (step 505). If the branch is not conditional, then the process ends (step 511). If, however, the branch is conditional, then the system checks the content of the instruction to see if the override is on in the instruction (step 507). If the override is on, then a check is made to determine if the branch has been mispredicted (step 510). If the branch has been mispredicted, then the system performs the necessary correction (step 506). The correction includes flushing the instructions after the conditional branch and fetching from the correct target address. After the correction, the process ends (step 511). If, however, the software override is not on, then the branch history table is updated (step 509) prior to the check for the misprediction (step 510). When the branch has not been mispredicted, a check is made to determine if it was predicted taken (step 512). When not predicted taken, the process ends (step 511). If predicted taken, a final check is made to determine if the target address is the correct target address (step 514). If it is not the correct target address, the system performs the necessary correction (step 506). If, however, it is the correct target address, the process ends.

While the invention has been particularly shown and described with reference to a preferred embodiment, it will be understood by those skilled in the art that various changes in form and detail may be made therein without departing from the spirit and scope of the invention. For example, the invention may be utilized with various other schemes besides the hint mechanism described herein. These other embodiments includes data prefetching, hints for prefetching, instruction prefetching, updating translation lookaside buffers, updating segment lookaside buffers, updating effective-to-read address translator, and any other instruction which can be utilized so that the execution of the instructions and subsequent discarding of them in effect improves the microprocessors performance by suitable a updating various cache, table or other structures maintained by the processor or memory subsystem.

What is claimed is:

1. A method for software manipulation of branch prediction mechanism in a data processor, said method comprising the steps of:
    setting a first software indicator to a first state when hardware prediction is to be used, wherein the first software indicator comprises a particular bit in an instruction;
    setting the first software indicator to a second state when software prediction is to be used;
    setting a second software indicator such that the software prediction consistently predicts in one particular branch direction for the branches, so that branch history table aliasing is reduced;
    predicting a first branch path by said processor according to hardware prediction of a processor branch prediction unit, when the first software indicator is in the first state; and
    predicting a second branch path by the processor according to software prediction, said software prediction being-initiated when the first software indicator is in the second state, wherein for branches at segments of seldom used code, the first software indicator provides the second state to the processor, so that software prediction is used for the branches instead of hardware prediction.

2. The method of claim 1, wherein for branches known to be predicted more accurately by software prediction than by hardware prediction, said method comprises setting the first software indicator to provide the second state to the processor, so that software prediction is used for the branches instead of hardware prediction.

3. A method for software manipulation of branch prediction mechanism in a data processor, said method comprising the steps of:
    predicting a first branch path to be taken by said processor determined by hardware prediction of a processor branch prediction unit, when a first software-generated indicator is in a first state;
    predicting a second branch path to be taken by the processor determined by software prediction, said second branch path being indicated by a second software-generated indicator, when the first software indicator is in a second state, wherein for synchronization branches, the first software-generated indicator communicates the second state to the processor, so that software prediction is used for the branches instead of hardware prediction; and
    setting the second software-generated indicator such that the software prediction consistently predicts in one certain branch direction for the branches, so that lock contention traffic is reduced.

4. A method for software manipulation of branch prediction mechanism in a data processor, said method comprising the steps of:
    predicting a first branch path to be taken by said processor determined by hardware prediction of a processor branch prediction unit, when a first software-generated indicator is in a first state;
    predicting a second branch path to be taken by the processor determined by software prediction, said second branch path being indicated by a second software-generated indicator, when the first software indicator is in a second state;
    selectively using a conditional branch instruction and a subsequent unconditional branch instruction as a hint to a memory system, wherein the second state of the first software indicator is communicated to the processor, so that software prediction is used for the conditional branch instruction instead of hardware prediction;
    directing, by the state of the second software indicator when the unconditional branch instruction is not to be used as a hint, that the conditional branch be taken, so that program execution branches around the unconditional branch instruction; and
    directing, by the state of the second software indicator when the unconditional branch instruction is to be used as a hint, that the conditional branch be not taken, so that when the unconditional branch instruction is used as a hint and the unconditional branch instructions are speculatively executed, the memory subsystem prefetches, from memory, data targeted by the unconditional branch instructions.

5. A system for software manipulation of branch prediction mechanism in a data processor, said system comprising:
   means for setting a first software indicator to a first state when hardware prediction is to be used, wherein the first software indicator comprises a particular bit in an instruction;
   means for setting the first software indicator to a second state when software prediction is to be used;
   means for setting a second software indicator generated by a software prediction unit, such that the software prediction consistently predicts in one particular branch direction for the branches, so that branch history table aliasing is reduced;
   means for predicting a branch path by a processor utilizing a processor hardware branch prediction unit, when a first software indicator communicates a first state to the processor;
   means for predicting the branch path by the processor utilizing the second software indicator, when the first software indicator communicates a second state to the processor, wherein for branches at segments of seldom used code, the first software indicator provides the second state to the processor, so that software prediction is used for the branches instead of hardware prediction.

6. The system of claim 5, wherein for branches known to be predicted more accurately by software prediction than by hardware prediction, said system comprises means for setting the first software indicator to provide the second state to the processor, so that software prediction is used for the branches instead of hardware prediction.

7. A system for software manipulation of branch prediction mechanism in a data processor, said system comprising:
   means for predicting a branch path by a processor utilizing a processor hardware branch prediction unit, when a first software indicator communicates a first state to the processor;
   means for predicting the branch path by the processor utilizing a second software indicator generated by a software prediction unit, when the first software indicator communicates a second state to the processor;
   wherein for synchronization branches, the system further comprising means for setting the first software indicator to communicate the second state to the processor, so that software prediction is used for the branches instead of hardware prediction; and
   means for setting the second software indicator such that the software prediction consistently predicts in one particular branch direction for the branches, so that branch history table aliasing is reduced and instructions within the critical section (guarded by atomic readwrite) can be executed speculatively.

8. A system for software manipulation of branch prediction mechanism in a data processor, said system comprising:
   means for predicting a branch path by a processor utilizing a processor hardware branch prediction unit, when a first software indicator communicates a first state to the processor;
   means for predicting the branch path by the processor utilizing a second software indicator generated by a software prediction unit, when the first software indicator communicates a second state to the processor;
   means for selectively using a conditional branch instruction and a subsequent unconditional branch instruction as a hint to a memory system, the second state of the first software indicator is communicated to the processor, so that software prediction is used for the conditional branch instruction instead of hardware prediction;
   means for directing, by the state of the second software indicator when the unconditional branch instruction is not to be used as a hint, that the conditional branch be taken, so that program execution branches around the unconditional branch instruction; and
   means for directing, by the state of the second software indicator when the unconditional branch instruction is to be used as a hint, that the conditional branch be not taken, so that when the unconditional branch instruction is used as a hint and the unconditional branch instructions are speculatively executed, the memory subsystem prefetches, from memory, data targeted by the unconditional branch instructions.

* * * * *